United States Patent
Ajmera et al.

(10) Patent No.: US 12,225,020 B2
(45) Date of Patent: Feb. 11, 2025

(54) TOKEN MANAGEMENT FOR ASYNCHRONOUS REQUEST-REPLY

(71) Applicant: Microsoft Technology Licensing, LLC, Redmond, WA (US)

(72) Inventors: Prasham Rajeshbhai Ajmera, Woodinville, WA (US); Izydor Gryko, Kirkland, WA (US); Richard Jose Mejia Valencia, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 548 days.

(21) Appl. No.: 17/496,627

(22) Filed: Oct. 7, 2021

(65) Prior Publication Data

US 2022/0321346 A1 Oct. 6, 2022

Related U.S. Application Data

(60) Provisional application No. 63/168,852, filed on Mar. 31, 2021.

(51) Int. Cl.
| | |
|---|---|
| *H04L 9/40* | (2022.01) |
| *H04L 9/32* | (2006.01) |
| *H04L 47/70* | (2022.01) |
| *H04L 47/762* | (2022.01) |
| *H04L 47/78* | (2022.01) |
| *H04W 12/08* | (2021.01) |

(52) U.S. Cl.
CPC .......... *H04L 63/108* (2013.01); *H04L 9/3213* (2013.01); *H04L 9/3228* (2013.01); *H04L 47/762* (2013.01); *H04L 47/781* (2013.01); *H04L 47/826* (2013.01); *H04L 63/0807* (2013.01); *H04L 63/0892* (2013.01); *H04W 12/08* (2013.01)

(58) Field of Classification Search
CPC ............... H04L 63/108; H04L 63/0807; H04L 63/0892; H04L 9/3213; H04L 9/3228; H04L 47/762; H04L 47/781; H04L 47/826; H04W 12/08
See application file for complete search history.

(56) References Cited

U.S. PATENT DOCUMENTS

| | | | |
|---|---|---|---|
| 6,219,711 B1 * | 4/2001 | Chari | G06F 13/4081 709/248 |
| 8,140,842 B2 | 3/2012 | Howard et al. | |
| 9,608,974 B2 | 3/2017 | Barrows et al. | |
| (Continued) | | | |

FOREIGN PATENT DOCUMENTS

WO 2016061520 A1 4/2016

OTHER PUBLICATIONS

Murayama, Daiki; Mizuno, Shouki; Fujii, Akihiro; "Distributed Synchronization over RESTful Web API," 18th International Conference on Network-Based Information Systems, Taipei, Taiwan, 2015, pp. 195-198.*

(Continued)

*Primary Examiner* — Victor Lesniewski
(74) *Attorney, Agent, or Firm* — Mannava & Kang, P.C.

(57) ABSTRACT

Token expiration is managed for requests in an asynchronous request-reply pattern of communication. If a token in a request expires, an operation to be performed utilizes a new token to execute the operation. The new token is obtained from a status check sent to a different location than the initial request.

19 Claims, 5 Drawing Sheets

(56) References Cited

U.S. PATENT DOCUMENTS

| | | | |
|---|---|---|---|
| 9,756,114 B2 | 9/2017 | Desai et al. | |
| 2016/0094636 A1* | 3/2016 | Carr | H04L 67/1001 |
| | | | 709/226 |
| 2016/0337127 A1* | 11/2016 | Schultz | H04L 9/3234 |
| 2017/0322976 A1* | 11/2017 | Tran | G06F 16/24553 |
| 2019/0102423 A1 | 4/2019 | Little et al. | |
| 2019/0230081 A1 | 7/2019 | Singh et al. | |
| 2019/0356495 A1* | 11/2019 | Dasarakothapalli | |
| | | | H04L 9/0894 |
| 2020/0272528 A1* | 8/2020 | Klein | G06F 9/54 |
| 2021/0176237 A1* | 6/2021 | Nishida | H04L 63/0853 |
| 2021/0344670 A1* | 11/2021 | Dachev | H04L 63/0846 |
| 2021/0359911 A1* | 11/2021 | Saraswat | H04L 63/0272 |
| 2022/0191267 A1* | 6/2022 | Bindal | H04L 67/02 |
| 2023/0164210 A1* | 5/2023 | Sodagar | H04L 67/566 |
| | | | 709/203 |

OTHER PUBLICATIONS

Jacob, Ideskog, "How to Handle Batch Processing with OAuth 2.0", Retrieved from: https://nordicapis.com/how-to-handle-batch-processing-with-oauth-2-0/, Jan. 24, 2017, 10 Pages.

Joao, Angelo, "How to handle user token expiration on long running asynchronous jobs?", Retrieved from: https://security.stackexchange.com/questions/142292/how-to-handle-user-token-expiration-on-long-running-asynchronous-jobs, Sep. 18, 2016, 2 Pages.

"International Search Report and Written Opinion Issued in PCT Application No. PCT/US22/020279", Mailed Date: Jun. 22, 2022, 13 Pages.

"Call Your API Using the Authorization Code Flow", Retrieved from: https://web.archive.org/web/20200920151534/https:/auth0.com/docs/flows/call-your-api-using-the-authorization-code-flow, Sep. 20, 2020, 11 Pages.

"IBM Cloud: The Asynchronous HTTP Interface", Retrieved from: https://cloud.ibm.com/docs/speech-to-text?topic=speech-to-text-async, Apr. 2, 2021, 12 Pages.

"StorageGRID® Webscale NAS Bridge 2.0.3 Management API Guide", Retrieved from: https://docs.netapp.com/sgws-110/topic/com.netapp.doc.nasbridge-api/Using%20the%20NAS%20Bridge%20Management%20API.pdf, Aug. 2019, 18 Pages.

Eastbury, et al., "Asynchronous Request-Reply Pattern", Retrieved from: https://docs.microsoft.com/en-us/azure/architecture/patterns/async-request-reply, Oct. 22, 2019, 10 Pages.

Communication pursuant to Article 71(3) EPC, Received for European Application No. 22716295.5, mailed on Jul. 10, 2024, 7 pages.

* cited by examiner

TOKEN MANAGEMENT FOR ASYNCHRONOUS REQUEST-REPLY

PRIORITY

The present application claims priority to U.S. provisional patent application Ser. No. 63/168,852 filed Mar. 31, 2021, which is incorporated by reference in its entirety.

BACKGROUND

Identity and access management (IAM) typically includes a framework of policies and technologies for ensuring that authorized people in an enterprise have the appropriate access to technology resources. Authentication (AuthN) and authorization (AuthZ) are two processes in IAM where AuthN verifies the identity of a user and AuthZ defines, grants, and enforces specific privileges of a user. Tokens are often used for AuthN and AuthZ. For example, a client application may depend on a remote application program interface (API) to execute a remote application which may be running in a multitenant environment. The user must present proper tokens for AuthN and AuthZ to the API to gain access to the remote application and to have the remote application perform desired operations. Commonly these API calls take place over Hypertext Transfer Protocol (HTTP) and follow Representational State Transfer (REST) semantics and can be done synchronously, e.g., client constructs an HTTP structure, sends a request, and waits for a response, or asynchronously, client constructs an HTTP structure, sends a request, and moves on and is notified when the response arrives.

When the client application is making an API call, in most cases, the API may respond to a request from a client application quickly, such as on the order of 100 milliseconds (ms) or less. However, in some situations execution of the request may exceed the token expiration, which may be due to a variety of factors, such as current load, time for backend processing of the request, size of the request payload, etc. In these situations, the token becomes invalid. As a result, the request from the client application cannot be successfully performed.

BRIEF DESCRIPTION OF DRAWINGS

Features of the present disclosure are illustrate by way of examples shown in the following figures. In the following figures, like numerals indicate like elements, in which.

DETAILED DESCRIPTION

Figure 1:
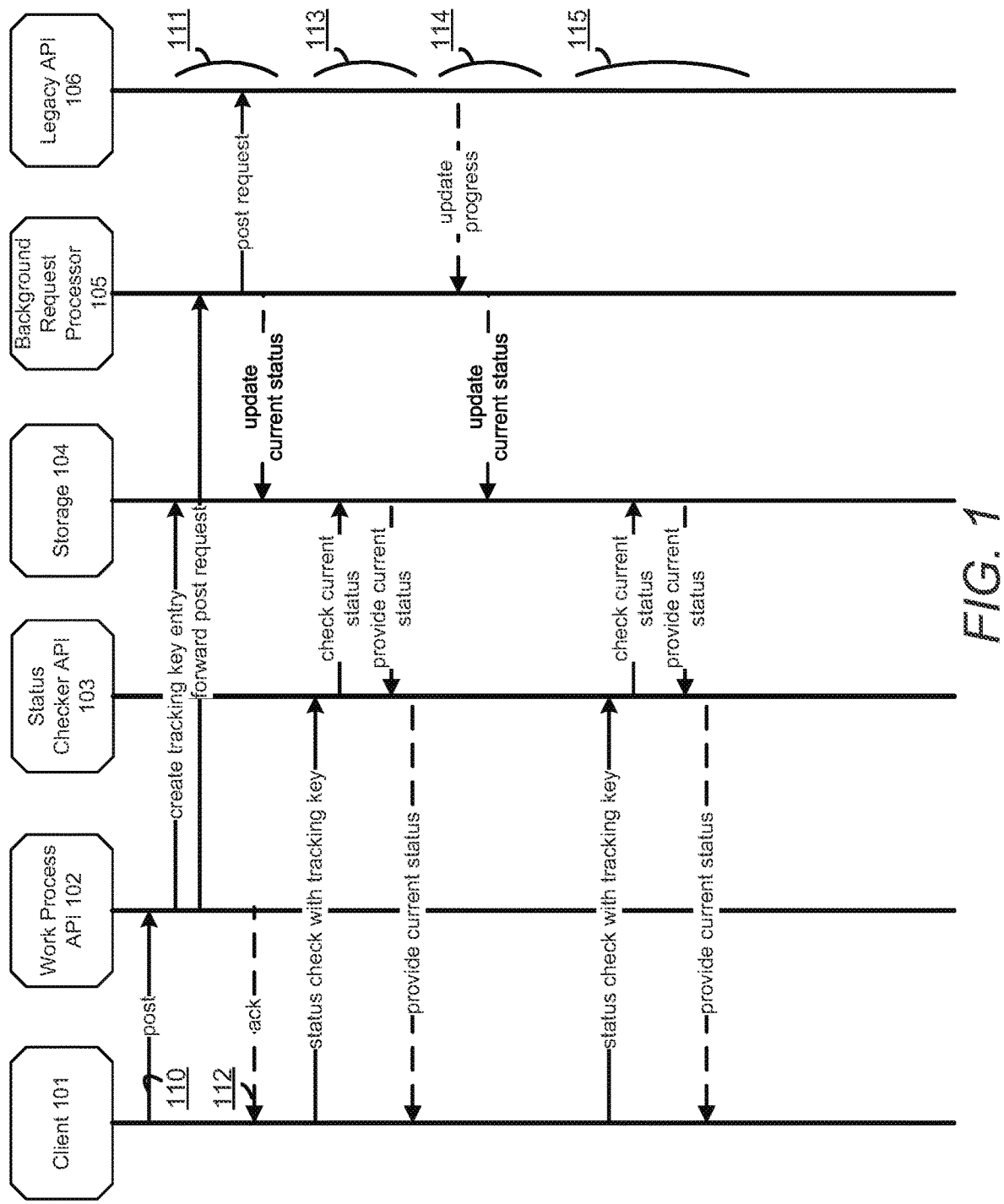
FIG. 1 shows an end-to-end asynchronous request-reply flow, according to an example of the present disclosure.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

According to an example of the present disclosure, token management is provided for an asynchronous request-reply pattern of communication that can be employed between a client application and a remote API to which the client application makes API calls. The asynchronous request-reply pattern allows the API to absolve itself from providing an immediate response to a request, and instead provides a way to provide a response later in time.

Furthermore, the token management includes a process for managing long-lasting procedures that are executed for a request and which otherwise may be difficult to manage due to the expiration of a token during the long-lasting procedure. Tokens are required for Auth N and AuthZ. A token has an expiration. Often, the default is set at one hour but expiration can be set at shorter time periods, such as within seconds or minutes. If a request in the asynchronous request-reply pattern requires execution of backend processes that takes longer than the expiration period of the token, it can result in failed execution of the requested operation that is requested in the API call to the remote API. To obviate the issue with token expiration, some systems may create a certificate that gives blind trust to the user, such as authorizes rights for the user for an extended period of time that exceeds the expiration of the token. However, this creates a security risk, because the certificate holder is allowed to perform various operations for an extended period of time even if the token is invalid.

According to an example of the present disclosure, token expiration is handled in a much more secure manner. For example, after a request from a client is accepted, the client is provided with a tracking key and a new location, such as a location of a status checker API, for checking the status of the request. The client, after a stated period of time, can send a status request to the status checker API along with the tracking key. When the client sends a request to a new location, such as the status request being sent to the status checker API instead of the initial request being sent to the remote API, the client automatically includes a new token according to existing client procedure. This new token is then used to determine status and respond to the client status request and to process the request if the initial token is expired. Accordingly, if the initial token is expired, the new token, which is unexpired, is available for authorization to process the request, and this process may be repeated as needed until the processing of the requested operation is completed. By way of this process, token expiration is managed in a more secure manner than issuing a certificate that allows the request to be processed despite an expired token. Furthermore, the client is not required to re-submit the initial request, so the client 101 is not required to perform any additional operations.

FIG. 1 shows an end-to-end asynchronous request-reply message flow according to an example of the present disclosure. Client 101 may include an application, also referred to as a client application, executed by a processor. In an example, the client 101 comprises code running in a web browser, or in another example the client 101 may include a standalone application that may not need a web browser to run. The client 101 communicates with remote APIs, e.g., API 102 and status checker API 103, such as to execute business logic or to perform other operations. The API 102 may also be referred to herein as a work process API. In an example, API 102, status checker API 103, storage 104, legacy API 106 and background request processor 105, which are described in detail below, are provided on a cloud of a cloud provider, and the client 101 accesses the cloud via the APIs to execute the request. The client 101 can access the APIs and the cloud via a network not shown.

The client 101 makes API calls to API 102 which by way of example may take place over the HTTP(S) protocol and follow REST semantics. In a running example which is used herein to describe the end-to-end asynchronous request-reply flow, the API 102 is for a tenant order service to order cloud resources from a cloud provider, such as orders for creating virtual machines (VMs), assigning database servers, performing billing tasks, etc.

At 110, the client 101 makes an API call to the API 102, e.g., an HTTP post request. The API call includes a request to perform an operation, which may trigger a long-running operation on the backend. For example, the request in the API call includes an order from a tenant for multiple VMs with particular images and database servers to be provided to the tenant by the cloud provider of the tenant. The request also includes a token, also referred to as an authorization token. The token may be one or more tokens used for AuthN and/or AuthZ. Also, the request may include a tag that identifies itself as an asynchronous request as opposed to a synchronous request. The API 102 can check for other errors in the request. Also, the API 102 can validate the client 101 and the request using the token, or the client 101 and the request may be subsequently validated using the token by the background request processor 105 before the requested operation in the request is executed by a request processing endpoint. The API 102 responds with an acknowledgement if the request is accepted, such as shown at 112, and the API 102 performs other operations, shown at 111, to have the request processed. If the request is not accepted, the API 102 responds with an indication that the request is not accepted as soon as possible, so the user can take corrective action as needed.

As indicated above, if the request is accepted for processing by the API 102, the operations are performed at 111 to get the request processed. For example, the API 102 creates a tracking key entry in storage 104 to track the progress of the order, which may include a requested operation, made in the request. Accordingly, the API 102 creates a tracking key for the request which is stored in storage 104. Storage 104 may include storage of the cloud provider that is accessible by the APIs and background request processor 105 shown in FIG. 1. In an example, the storage 104 may include object storage (e.g., blob storage) in the cloud. The API 102 forwards the order to the background request processor 105 for execution, shown as forward post request. The background request processor 105 may forward the order to a legacy API 106 if needed for execution, e.g., post request to legacy API 106. The background request processor 105 can update the progress of the execution of the order of the request from client in the storage 104, such as by storing status codes in the storage 104 for the corresponding tracking key of the request. The status codes indicate the progress of the processing of the request. For example, the storage 104 may store a status code, such as for waiting, processing, finished, or error (when listener can't process it). At 112, the API 102 responds back to the client 101 with an acknowledgment. The acknowledgment includes (1) the status code, such as HTTP status code 202 indicating that the request has been accepted for processing but is not completed (in fact processing may not have been started), (2) the tracking key, (3) a location, such as a URL for status checker API 103, for checking the ongoing status of the order, and (4) a retry-after value indicating an amount of time to wait before checking the location for the status of the order. Subsequently, the client 101 can send a message, including the tracking key, to the location, such as the location of status checker API 103 instead of API 102, after waiting for the amount of time specified by the retry-after value to check on the progress of the execution of the order. Location may refer to a URL, IP address or another type of address that is used to identify a destination for a message or request that may be sent over a network. The operations performed at 111 may be performed by the API 102, status checker API 103, the storage 104, the background request processor 105, and the legacy API 106. The API 102, status checker API 103, the storage 104, the background request processor 105, and the legacy API 106 may comprise machine readable instructions executable by a processor on different servers, but it will be apparent to one of ordinary skill in the art that one or more of these elements may reside on the same server. The storage 104 may include storage in a cloud environment as was indicated above.

At 113, operations are performed to check the status of the processing of the request that was initially made at 110, such as the status of the order for the VMs and database servers. For example, the client 101 sends a status check (e.g., HTTP get message), including the tracking key, to the status checker API 103 after waiting for the amount of time specified by the retry-after value to check on the progress of the order, Because the client 101 is sending the status check to a new location, such as sending the status check to the status checker API 103 instead of the API 102, the client 101 includes a new token in the status check. This new token may be used for processing the status check and for processing the execution of the order if the original token provided by the client 101 at 110 is expired, as is further described below with respect to FIG. 2 and other figures. The status checker API 103 uses the tracking key provided in the status check to check the current status of the order in the storage 104. The background request processor 105 may have previously updated the current status in the storage 104 with a status code indicating that the execution of the order is in progress, such as shown at 111, and, at 113, the status checker API 103 retrieves the code indicating the current status from the storage 104 and sends it back to the client 101 along with a retry-after value and the URL for the status checker API for the client 101 to subsequently check the status of the initial request.

At 114, the legacy API 106 updates the progress of the processing of the request. For example, order processing is completed and the legacy API 106 sends a progress update to the background request processor 105 to indicate that the processing is finished. The background request processor 105 updates the storage 104 to indicate that the current status of the order is completed. At 115, the client 101 checks the status of the order again, such as similarly described with respect to 113. For example, the client 101 sends a status check (e.g., HTTP get message), including the tracking key, to the status checker API 103 after waiting for the amount of time specified by the retry-after value to check on the progress of the order. The status checker API 103 retrieves the code indicating finished from the storage 104 using the tracking key and sends it back to the client 101.

Figure 2:
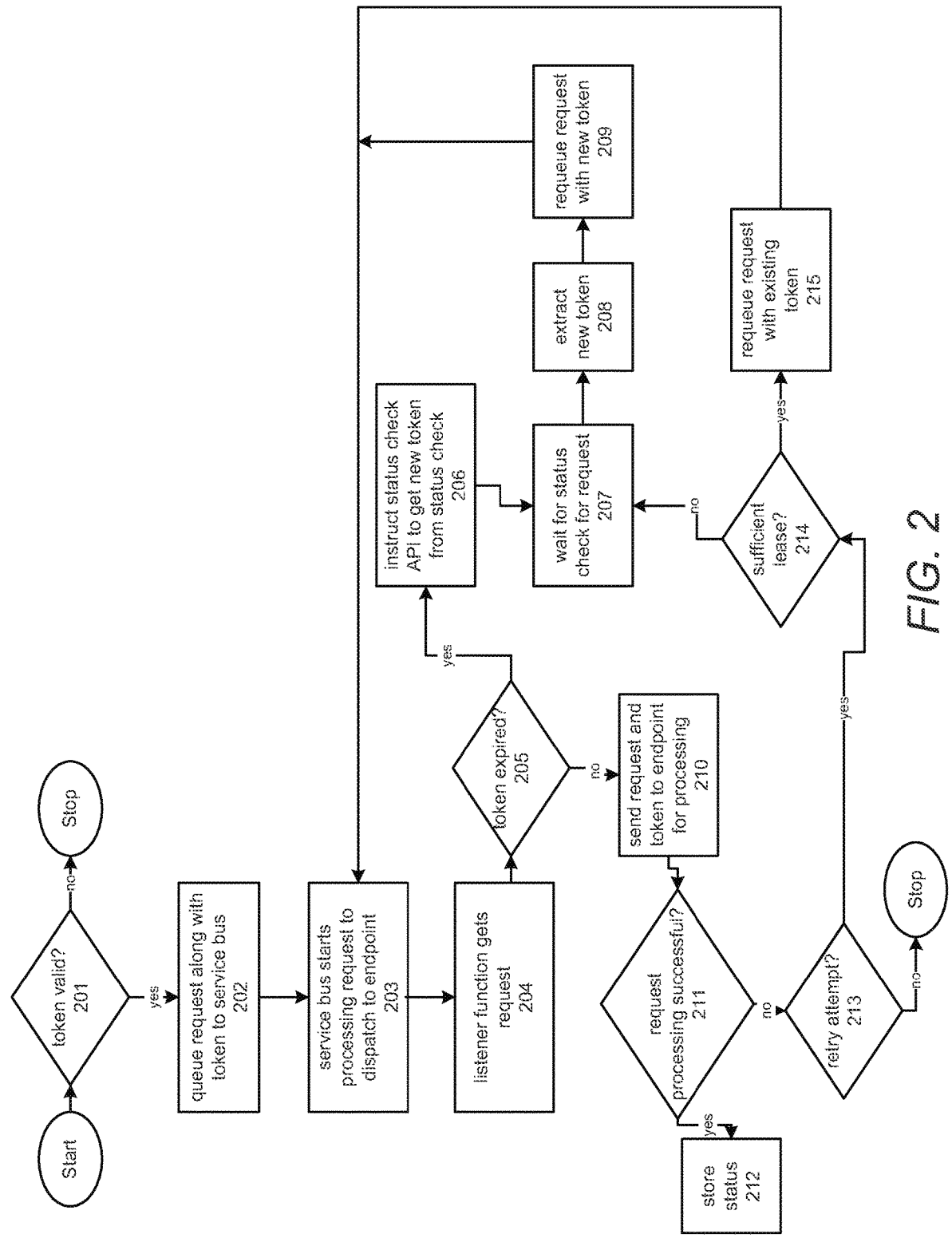
FIG. 2 illustrates a flow chart for managing token expiration for the asynchronous request-reply flow, according to an example of the present disclosure.

FIG. 2 illustrates a flow chart for managing token expiration for the asynchronous request-reply flow, according to an example of the present disclosure. The steps of FIG. 2 may be performed by the background request processor 105. Referring back to FIG. 1 in the running example discussed above, the initial request at 110 includes an order for VMs and database servers to be provided to a tenant of a cloud provider. The execution of the order may take longer than the expiration time of the token provided by the client 101 at 110. To prevent the order from not being processed due to token expiration, the new token provided by the client 110 at 113 is used to continue processing of the order if the initial token expired, as is further discussed below.

At 201, the background request processor 105 checks whether the token provided by the client 101 is valid. This may include a validation for AuthN and AuthZ. For example, the token was previously extracted from a request sent from the client 101 and stored in the storage 104, and the background request processor 105 validates the token for AuthN and AuthZ. If the token is valid, the request, such as the requested order for VMs and database servers, is queued on a service bus, such as service bus 310 shown in FIG. 3, at 202, and, at 203, the request is processed by the service bus to dispatch to a request processing endpoint, such as one of the request processing endpoints 312 shown in FIG. 3, that can process the request. For example, the background request processor 105 may include a service bus to handle a high volume of incoming requests and to dispatch the requests to proper endpoints for servicing the requests. In an example, the service bus implements topics for message brokering and enables multiple receivers or request processing endpoints to process different messages based on topic at any given point of time. This helps with surges in requests and keeps total turnaround time for any operation at a minimum. Also, the background request processor 105 includes a listener function, such as listener function 311 shown in FIG. 3, that receives the request at 204 and checks whether the token is expired at 205. If the listener function determines the token is not expired, the request and the token are submitted to a request processing endpoint that can process the request. However, if the token is expired, the request cannot be executed. To overcome the issue of an expired token, the listener function acquires a new token from the status checker API 103 at 206. For example, the listener function instructs the status checker API 103 to get the new token at 206 when the status check is received, the status checker API waits for the status check from the client 101 at 207 and extracts the new token at 208 when the status check is received, and requeues the request for the order with the new token at 209. The new token that is not expired may be stored in the storage 104 so the request for the order can be executed by the proper request processing endpoint. In the running example of the request including the order for creating VMs and assigning database servers, the proper endpoint may be a provisioning endpoint comprised of a server or VM of the cloud provider that is available and capable of executing the order. By way of steps 206-209, token expiration is managed without issuing a certificate that allows the request to be processed despite an expired token. Also, the client 101 is not required to re-submit the request with the initial order, so the client 101 is not required to perform any additional operations.

At 205, if the token is not expired, then the listener function decrypts the token and submits it with the request to the endpoint that will execute the request at 210. At 211, if the order execution is determined to be successful, then, at 212, a response is stored in the storage 104. For example, the background request processor 105 updates the storage 104 with a status code for the request indicating the order is finished. Then, the status checker API 103 can retrieve the status code from the storage 104 and send the response to the client 110 indicating the request is finished processing, such as shown at 115 in FIG. 1. At 211, if the order execution is determined not to be successful, then, at 213, a determination is made as to whether the number of attempts is greater than a threshold. If so, order execution is terminated and status may be updated accordingly in the storage 104 so the client 101 can be notified. If the number of attempts does not exceed the threshold as determined at 213, then, at 214, a determination is made as to whether the token has sufficient lease. For example, the amount of time left until expiration of the token is determined. The amount of time left until expiration of the token must be sufficient to complete processing of the request. If the amount of time left until expiration of the token is considered insufficient, such as by comparing the amount of time left until expiration of the token to average times or another preset threshold time to complete requests of a particular type, the token is determined to have insufficient lease. If the token lease is determined to be insufficient at 214, the processing continues to step 207 where the new token is extracted from a recent client status check such as described above. If the token lease is determined to be sufficient at 214, the request is requeued to the service bus with the existing token at 215.

Figure 3:
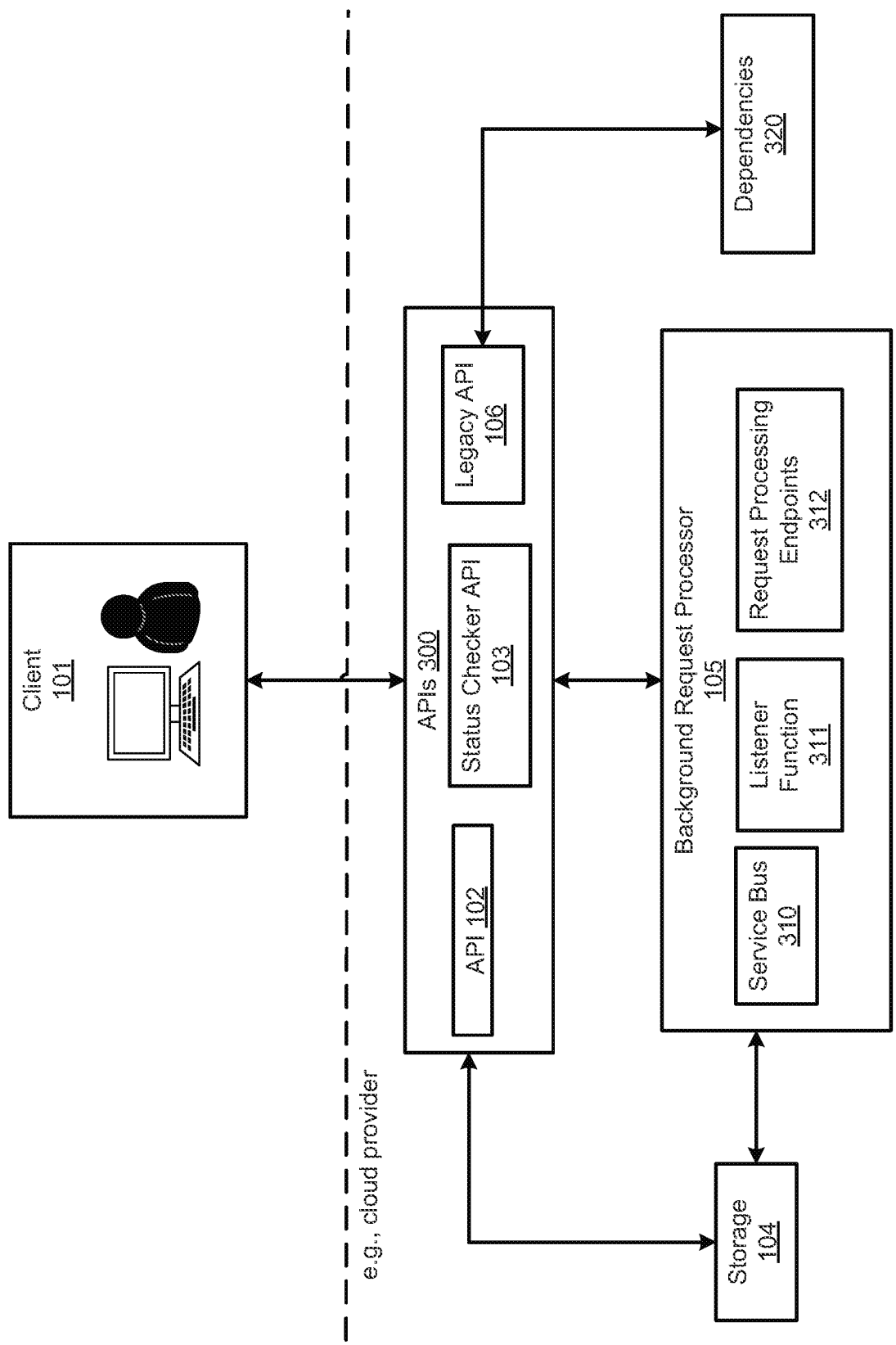
FIG. 3 shows a system block diagram, according to an example of the present disclosure.

FIG. 3 shows a system block diagram of the components described above with respect to FIGS. 1-2, according to an example of the present disclosure. Client 101 may communicate with APIs of API 300, such as API 102 and status checker API 103 to submit requests and status checks such as described above. The client 101 may communicate with the APIs over a network, not shown. The client 101 may include a web application or a standalone application executed by a processor of a computer.

The storage 104 is used for request tracking and storing status. It follows the below-described schema. The storage 104 stores a tracking key used to identify the user when the client 101 sends a status check. The storage 104 also stores the state of a request, such as waiting, processing, finished, and error (e.g., when the listener function 311 can't process the request). The storage 104 also stores a status code, such as an HTTP status code that is returned to the client 101. The storage 104 also stores a number of status checks, which represent how many times the status check API 103 has checked for given request status. The storage 104 also stores a response (once available) for a current request. This can represent successful response provided by an underlying API or error message. The storage 104 also stores a number of requeuings, such as how many times the listener function 311 must requeue a request back to the service bus. The storage 104 also stores the encrypted token, and a timestamp for each update, such as for analytics purposes. In an example, the storage 104 is a cloud storage of the cloud provider that supports the order service for tenants to order cloud resources.

The background request processor 105 may include service bus 210, listener function 311 and request processing endpoints 312. In an example, the request processing endpoints 312 may be external to the background request processor 105, and the listener function 311 and/or service bus 310 send requests to the appropriate request processing endpoints to process the requests queued on the service bus 310. The operations performed by the service bus 310 and the listener function 311 are further described above with respect to FIG. 2. The service bus 310 and the listener function 311 may include machine readable instructions executed by a processor. The request processing endpoints 312 may include hardware and software for executing requests. For example, assuming the client 101 sends requests to a cloud provider for managing virtual resources, the request processing endpoints 312 perform the requests, such as provisioning and deprovisioning cloud resources for a tenant, etc.

The legacy API 106 may be called by the background request processor 105 to execute a request. In an example, the API 102 is for an order service that client 101 interacts with to order resources from the cloud provider. The order service may interact with customers and have dependencies 320 on other downstream services. The background request processor 105 may make API calls to the legacy API 106 when a downstream service is required to execute an order. In some instances, the dependencies 320 have low reliability due to scaling constraints or other factors. By using the legacy API 106, the order service can be decoupled from less reliable dependencies. This way the order service can be shielded from reliability dips caused by the dependencies 320. Thus, a buffer is provided between the order service or another service provided by the background request processor 105 and dependency failures.

Figure 4:
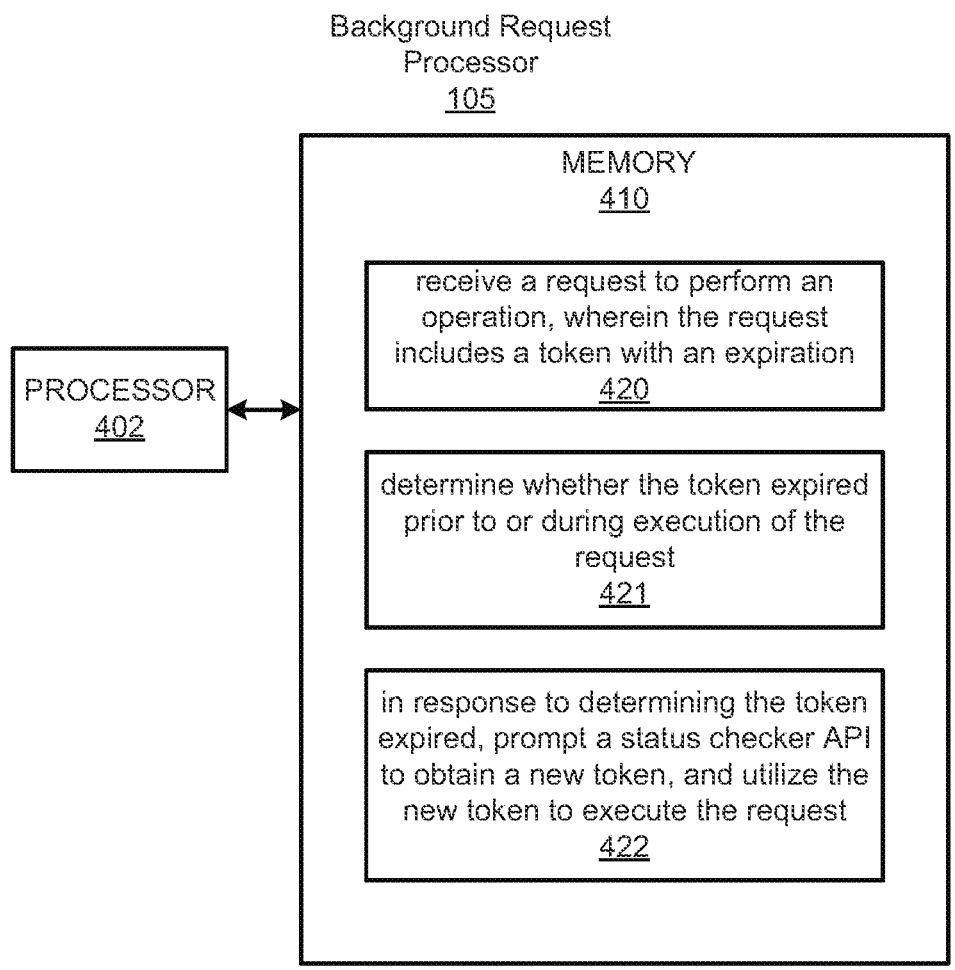
FIG. 4 shows operations of a background request processor, according to an example of the present disclosure.

FIG. 4 shows a block diagram for the background request processor 105, according to an example of the present disclosure. The processor 402 may include a single or multiple hardware processors or other hardware processing circuit, to execute the methods, functions, and other processes described herein. These methods, functions, and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The memory 410 may include one or more storage devices, such as RAMs, where the machine-readable instructions and data for a processor may reside during runtime. Also, APIs 300 and other processes described herein may comprise machine readable instructions stored on a non-transitory machine readable medium and executed by a hardware processor. Referring to the block diagram shown in FIG. 4, the memory 410 may include machine readable instructions executable by the processor 402. The machine-readable instructions may include instructions 420 to receive a request to perform an operation, wherein the request includes a token with an expiration: instructions 421 to determine whether the token expired prior to or during execution of the request; and instructions 422 to in response to determining the token expired, prompt status checker API 103 to obtain a new token, and utilize the new token to execute the request.

Figure 5:
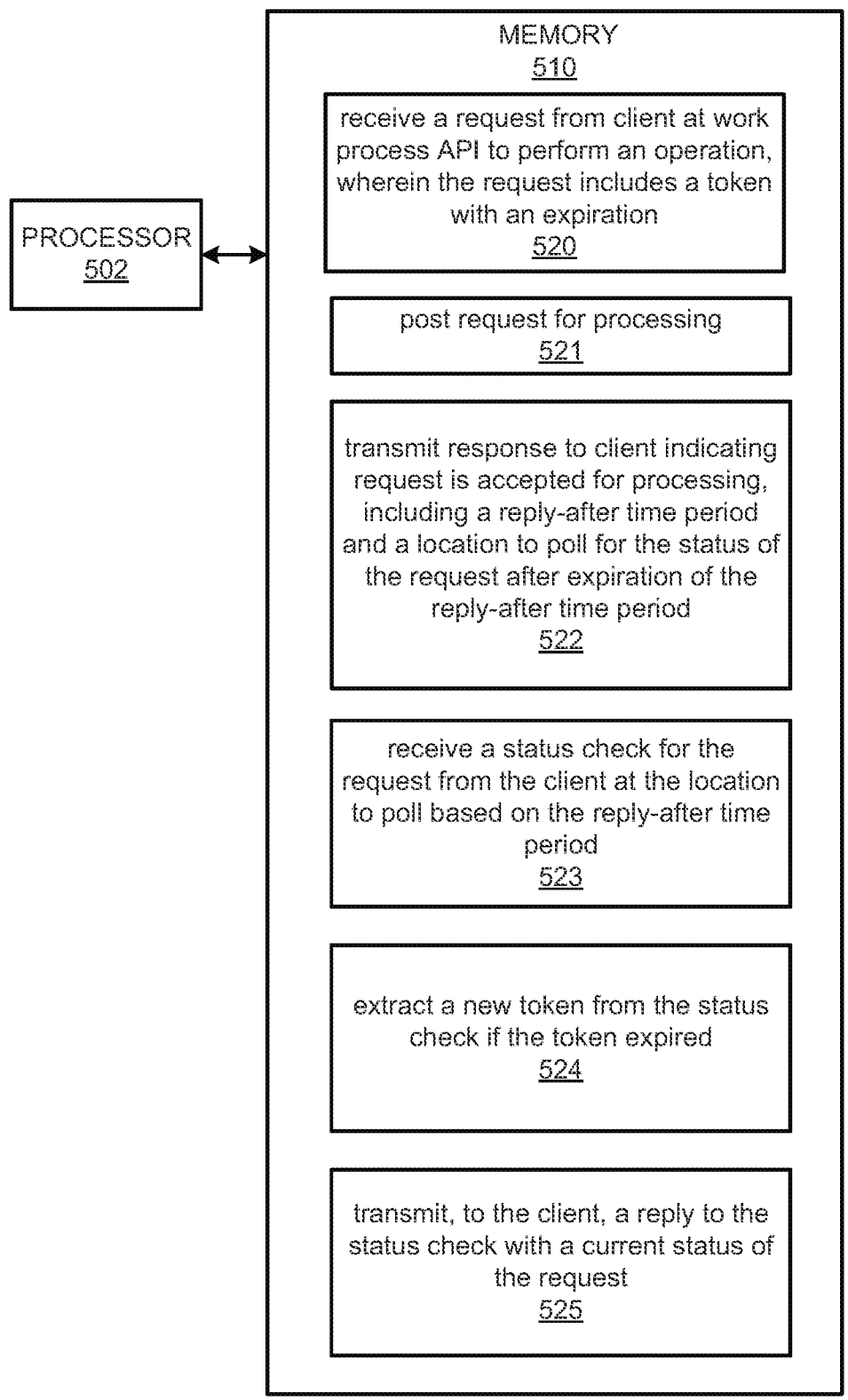
FIG. 5 shows a block diagram for a computer-implemented method to manage execution of a request that outlasts token expiration in an asynchronous request-reply pattern, according to an example of the present disclosure.

FIG. 5 shows a block diagram for a computer-implemented method to manage execution of a request that outlasts token expiration in an asynchronous request-reply pattern, according to an example of the present disclosure. The computer-implemented method is described by way of example as being performed by one or more of the components shown in FIGS. 1 and 3. At 520, a request is received from client 101 at work process API 102 to perform an operation, wherein the request includes a token with an expiration. At 521, the request is posted for processing. For example, the request is posted to service bus 310 so it can be processed by a request processing endpoint. At 522, a response is transmitted to the client 101 indicating the response is accepted for processing, wherein the response includes a reply-after time period, and a location to poll for the status of the request after expiration of the reply-after time period, and wherein the location to poll is different from the work process API. At 523, a status check for the request is received from the client 101 at the location to poll, e.g., the status checker API 103, based on the reply-after time period. At 524, a new token is from the status check if the token is expired. At 524, a reply to the status check is transmitted to the client 101 with a current status of the request. The computer implemented method may be executed by processor 502 which may include a single or multiple hardware processors or other hardware processing circuit, to execute the methods, functions, and other processes described herein. The steps of the method may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The memory 510 may include one or more storage devices, such as RAMs, where the machine-readable instructions and data for a processor may reside during runtime.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

What is claimed is:

1. A system operable to manage execution of a request that outlasts token expiration in an asynchronous request-reply pattern, the system comprising:
   at least one hardware processor;
   a work process application program interface (API) executed by the at least one hardware processor to:
      receive a request from a client to perform an operation, wherein the request includes a token with an expiration;
      create a tracking key for the request;
      post the request for processing; and
      transmit a response to the client in response to accepting the request, wherein the response includes a reply-after time period, the tracking key, and a location to poll for a status of the request after expiration of the reply-after time period, wherein the location to poll for the status of the request is different from a location of the work process API; and
   a status checker API executed by the at least one hardware processor to:
      wait for a status check of the request from the client upon a determination that the token has expired;
      receive the status check for the request from the client based on the reply-after time period and the location to poll, wherein the status check includes a new token and the tracking key;
      check the status of the request using the tracking key;
      extract the new token from the status check based on the new token being needed to execute the request;
      requeue the request with the new token without issuing a certificate; and
      send a reply to the status check with a current status of the request.

2. The system of claim 1, further comprising:
a background request processor executed by the at least one hardware processor, the background request processor to:
determine that the token expired prior to execution of the request; and
utilize the new token to execute the request; and
a storage to store the token, the new token, the tracking key, and the current status of the request.

3. The system of claim 2, wherein the status checker API compares the tracking key received in the status check with the tracking key stored in the storage, wherein the tracking key is initially stored in the storage responsive to receiving the request, in order to check the status of the request.

4. The system of claim 2, wherein the background request processor updates the current status of the request in the storage.

5. The system of claim 2, wherein to determine whether the token expired prior to execution of the request, the background request processor is to:
determine whether the token is expired; or
determine whether the token has sufficient lease to complete the request.

6. The system of claim 1, wherein the token and the new token are validated prior to processing the request and the status check.

7. The system of claim 6, wherein the token is validated for at least one of authentication (AuthN) and authorization (AuthZ) in an identity and access management process.

8. The system of claim 1, wherein the request is from a tenant of a cloud provider and the request comprises an order for resources from the cloud provider.

9. The system of claim 1, wherein the request comprises a request for the operation to be performed by an application hosted on a cloud.

10. The system of claim 1, wherein to extract the new token from the status check based on the new token being needed to execute the request, the status checker API extracts the new token from the status check responsive to a prompt from a background request processor.

11. The system of claim 1, wherein the location to poll for the status of the request is the location of the status checker API.

12. A computer-implemented method to manage execution of a request that outlasts token expiration in an asynchronous request-reply pattern, the method comprising:
receiving a request from a client to perform an operation at a work process application program interface (API), wherein the request includes a token with an expiration;
creating a tracking key for the request;
posting the request for processing;
transmitting a response to the client indicating the response is accepted for processing,
the response including a reply-after time period, the tracking key, and a location to poll for a status of the request after expiration of the reply-after time period,
wherein the location to poll for the status of the request is different than a location of the work process API;
determining that the token transmitted with the request has expired;
waiting for a status check of the request from the client upon a determination that the token has expired;
receiving the status check for the request from the client at the location to poll based on the reply-after time period, wherein the status check includes a new token and the tracking key;
checking the status of the request using the tracking key;
extracting the new token from the status check based at least on the token having expired;
requeuing the request with the new token without issuing a certificate; and
transmitting, to the client, a reply to the status check with a current status of the request.

13. The computer-implemented method of claim 12, wherein the location to poll comprises a status checker API, and the method further comprises:
determining, by the status checker API, whether the token is expired prior to execution of the request; and
in response to determining the token expired, prompting the status checker API to obtain the new token from the received status check to execute the request.

14. The computer-implemented method of claim 13, comprising:
storing the new token and the current status of the request in a storage accessible by the status checker API;
retrieving, by the status checker API, the current status of the request to provide to the client; and
storing the tracking key in the storage responsive to receiving the request from the client at the work process API, wherein the stored tracking key facilitates subsequent checking of the status of the request.

15. The computer-implemented method of claim 13, further comprising:
determining whether starting execution of the request is successful; and
in response to determining that the starting of the execution of the request is unsuccessful,
retrying the starting of the execution of the request unless a number of attempts for retrying the starting of the execution of the request exceeded a threshold.

16. The computer-implemented method of claim 15, further comprising:
in response to the number of attempts for retrying the starting of the execution of the request not exceeding the threshold,
requeuing the request for execution based on the new token has sufficient lease.

17. The computer-implemented method of claim 12, further comprising:
determining a current status of the request; and
storing the current status in a data storage that is accessible by a status checker API.

18. The computer-implemented method of claim 12, further comprising:
retrieving the new token from a data storage accessible by a status checker API; and
queuing the request for processing by a processing endpoint using the new token.

19. The computer-implemented method of claim 12, wherein the token comprises at least one of a token for validating authentication (AuthN) and a token for validating authorization (AuthZ) in an identity and access management process.

* * * * *